United States Patent [19]

Lee et al.

[11] 4,411,566

[45] Oct. 25, 1983

[54] SELF-LUBRICATING CUTTING TOOL AND METHOD

[75] Inventors: Minyoung Lee; William R. Reed, Jr., both of Schenectady; Lawrence E. Szala, Scotia, all of N.Y.

[73] Assignee: General Electric Company, Schenectady, N.Y.

[21] Appl. No.: 222,786

[22] Filed: Jan. 5, 1981

[51] Int. Cl.³ .............................................. B26D 1/00
[52] U.S. Cl. .................................. 407/119; 76/101 R; 427/343; 428/628
[58] Field of Search ................. 407/119; 76/DIG. 11, 76/101 R; 148/31.5; 428/628, 565, 562; 427/343, 248.1

[56] References Cited

U.S. PATENT DOCUMENTS

| | | | |
|---|---|---|---|
| 1,967,020 | 7/1934 | Canfield | 407/119 |
| 3,419,363 | 12/1968 | Sliney | 428/565 |
| 4,013,487 | 3/1977 | Ramqvist et al. | 148/31.5 |
| 4,203,690 | 5/1980 | Tanaka et al. | 407/119 |

FOREIGN PATENT DOCUMENTS

| | | | |
|---|---|---|---|
| 659891 | 10/1951 | United Kingdom | 407/119 |
| 660129 | 10/1951 | United Kingdom | 407/119 |

Primary Examiner—Leonidas Vlachos
Attorney, Agent, or Firm—Leo I. MaLossi; James C. Davis, Jr.; James Magee

[57] ABSTRACT

A self-lubricating cemented carbide cutting tool of special utility in titanium machining having a copper coating bearing a film of copper iodide is provided by coating the tool with a layer of copper, heating to bond the copper to the cemented carbide and thereafter reacting the copper with iodine to form the film of desired thickness.

8 Claims, 5 Drawing Figures

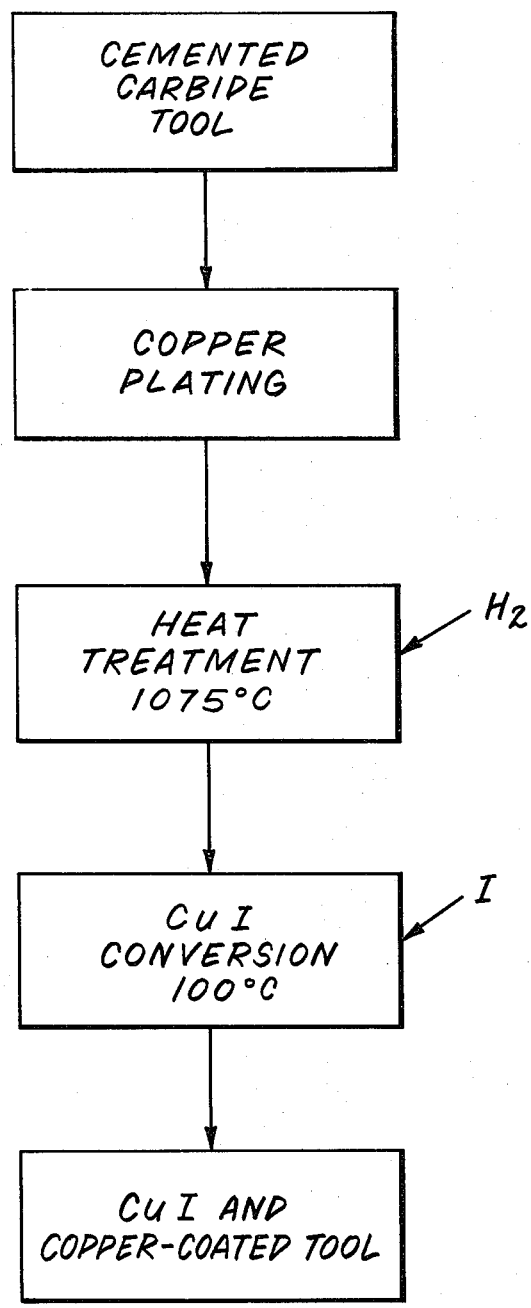
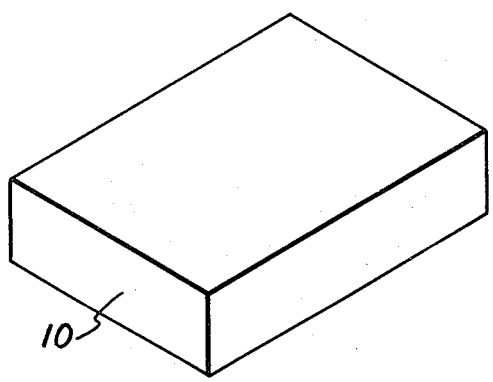
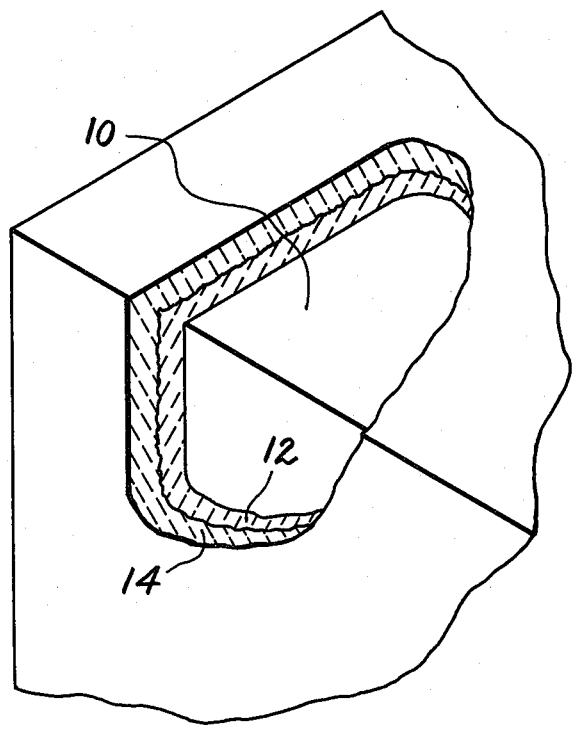

SELF-LUBRICATING CUTTING TOOL AND METHOD

The present invention relates generally to the cutting tool art and is more particularly concerned with novel cemented carbide and steel tools having long-lasting self-lubricating characteristics, and with a new method for producing such tools.

BACKGROUND OF THE INVENTION

The need for some method or means by which certain machining operations can be effectively lubricated has long been generally recognized. Thus, for example, titanium cutting operations present special problems of high temperature and rapid tool wear which have withstood all prior efforts of others to minimize or eliminate them. One such attempt involved the application to a cutting tool of a coat of solid lubricant, primarily molybdenum disulfide, with the objective of providing a lubricating layer directly at the critical tool-chip contact zone. While positive lubricating results were reported on the basis of laboratory tests, the coated tools in a production floor operation did not prove to be any better than the same tools in uncoated condition.

Another approach based on the knowledge that iodine apparently reacts with titanium to form a titanium di-iodide layer which serves as an excellent lubricating surfaced involved the addition of iodine to conventional cutting fluids. This proved to have the main drawback that iodine used in that manner has a markedly corrosive effect upon the machine tools on which these fluids are used.

SUMMARY OF THE INVENTION

On the basis of our discoveries and new concepts set out below, it is now possible to provide lubrication to tool-chip and to tool-work contact zones and actually to the cutting point itself in a continuous manner over prolonged periods of cutting action. This can be accomplished in other metal cutting operations as well as in titanium machining and with steel tools as well as those of cemented carbide. Moreover, these new results are obtainable without significant tool production complication or cost penalty and without detrimental effect upon the machining process, the machined product or the machine tool itself.

The central novel concept underlying this invention is to provide as a part of the tool a solid substance having the ability under metal cutting conditions to react to produce a substance effective to provide such lubrication (i.e., a solid lubricant precursor). Further, the solid substance is in the form of a film bonded to the tool surface which in normal use is at the cutting point and is reactive with the workpiece metal to provide the desired lubricating effect.

We have found that copper iodide is such a substance, that it can be provided in adequate amount in film form for this lubricating purpose for a prolonged period of cutting action, and that such film can be securely attached to the tool body by means of a copper coating bonded to the body surface. Still further, it appears that the lubricating effect of this novel tool in titanium machining is the result of formation of titanium di-iodide in the tool-work contact zone.

It is another new concept of ours that tools which are of cemented carbide or of tool steel, or other suitable material, particularly adapted for the cutting of metal and especially hard metal such as titanium and its alloys can be used in accordance with this invention to obtain these new results and advantages. The lubricating phase is provided in all such instances in the same general way according to the basic concept set out above. Consequently, in each instance, the lubricant precursor is provided in solid form preferably as a film and preferably the film is part of a coating which itself is bonded to the tool to maintain the film in place on the tool in a cutting operation in which the film is progressively reacted and consumed in providing the necessary lubricating effect. Thus, this effect is obtained according to this invention by means of copper iodide.

Briefly described then, the self-lubricating cutting tool of this invention comprises a tool body, a copper coating on the body, and a copper iodide film on the copper coating surface.

In its method aspect, this invention comprises the steps of forming a tool body of cemented carbide or tool steel of desired size and shape, coating the body with a layer of copper, heating the body and thereby bonding the copper layer to the body, and contacting the copper layer with iodine and reacting the iodine with the copper to form an adherent film of copper iodide on the tool.

BRIEF DESCRIPTION OF THE DRAWINGS

FIG. 1 is a flow sheet of the preferred method of this invention.

FIG. 2 is a perspective view of a tool of this invention.

FIG. 3 is a fragmentary enlarged sectional view of the tool FIG. 1 showing the unique structure of the tool, particularly the metal cutting lubricant precursor film and the metal layer bonding that film to the tool body.

DETAILED DESCRIPTION OF THE INVENTION

Figure 4:
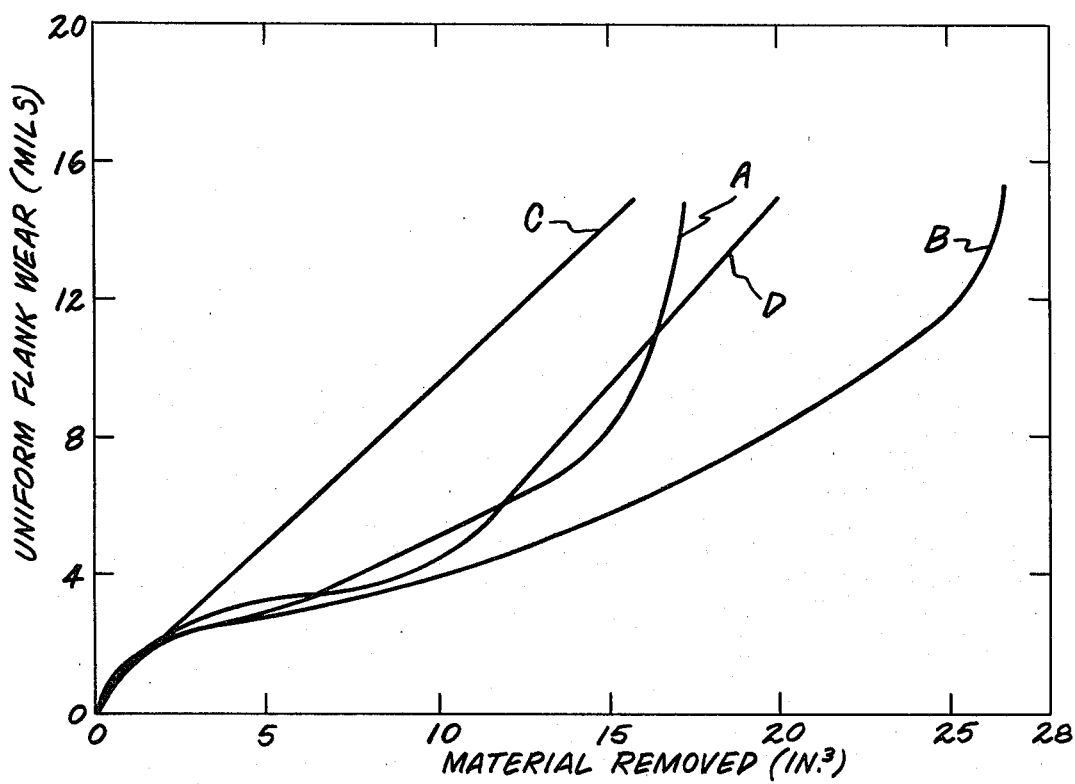
FIG. 4 is a chart on which uniform flank wear (in mils) is plotted against material removed (in cubic inches), the four curves illustrating the data gathered in experiments comparing tools of the present invention with those of the prior art.

In preferred practice of the process of this invention, a coating of copper is applied to a cemented carbide tool. While this initial step of the process may be carried out in any desired manner to provide a copper coat of the desired thickness, our preference is to electroplate the copper and to limit the thickness of the metal coat to less than about 25 microns but to more than one micron. As an alternative, within the scope of the invention, the copper coating may be applied to advantage by vapor deposition. Secure bonding of the copper coat to a cemented or other tool body in this preferred practice is the next step in the process and is accomplished by heating to about 10 or 20 degrees centigrade below the melting point temperature of copper in a hydrogen atmosphere for a few minutes to sinter the copper in contact with the tool surface. This results in development of a secure bond as the copper cools after penetrating very superficially into the surface of the tool body during sintering.

The copper coating can be applied to tools other than cemented carbide tools, such as tool steel. In the case of tool steels the copper bonding will be accomplished at temperatures of about 700° C. with operating times of 10–15 minutes.

The next step in the process involves contacting the copper with iodine in any convenient form, solid, liquid or gaseous, while the tool body, and particularly the surface of the copper coating, it at a temperature at which reaction with the iodine will result. As indicated in FIG. 1, this reaction will proceed at an adequate rate at about 100° C. and, in fact, we have found that conversion to copper iodide will occur in a matter of a few seconds at that temperature, simply by having iodine crystals in contact with the coating. This reaction, however, is carried only to the extent that a thin film of copper iodide product is formed as there is no substantial cutting lubricating advantage to be gained by converting most of the copper coating to iodide but there is a serious adherence problem if the copper is largely converted to iodide, particularly in the region of the tool body surface itself, there being a very limited adherence naturally between the iodide and the cemented carbide.

Cemented carbide tool 10 of FIG. 2 of usual size and shape, is subjected to the process of the flow sheet of FIG. 1 with the result that it has the superficial structural characteristics schematically illustrated in FIG. 3. Thus, this new tool product of our invention, as it emerges from the FIG. 1 process, has an adherent coating 12 of copper and a somewhat thinner overcoating 14 of copper iodide. The entire surface of tool 10 is covered in this instance, but it will be understood that if desired, copper coating 12 and iodide film 14 can be limited in extent to those parts of tool 10 which are intended to be used in actual cutting operations and, consequently, directly involved in the metal cutting action to be lubricated by the iodide phase in accordance with this invention.

Experiments designed to compare these new tool products with prior art tools are set out in the following illustrative, but not limiting, examples:

EXAMPLE I

Four cemented tungsten carbide tools, that is, machine tool inserts as they are known in the trade, manufactured and marketed by General Electric Company under the designation Grade 883 SNG 434, were each electroplated with a layer approximately 0.0002 to 0.0003 inch thick of copper and then fired in hydrogen at 1075° C. for about two minutes to insure bonding of the copper coating to the cemented tungsten carbide surface. After cooling to about room temperature, three of the coated tools were reheated to about 100° C. and iodine crystals were applied to their surfaces for 30 seconds. X-ray diffraction analysis of the treated surface indicated copper iodide to be the reaction product constituting a surface film of the copper layer.

Two of the copper iodide film-copper-coated tools were subjected, along with two uncoated tools as control specimens, to cutting tasks performed on a two-foot billet of titanium alloy containing 6% aluminum and 4% vanadium; the billet being about 3 inches in diameter and measured hardness of 32.7 Rockwell C. Turning tests were performed on a Lodge and Shipley Model 2013 engine lathe, running at speed of 250 surface feet per minute with a geometry of 15° side cutting edge angle, minus 5° back-rake angle, minus 5° siderake angle. In one test the removal rate was set at 1.03 cubic inch per minute by setting the feed at 0.007 inch per revolution (ipr) and depth of cut of 0.050 inch. The removal of material was measured, as was uniform flankwear, and these are plotted on the chart of FIG. 4 where Curve A represents the data gathered on the first run using a control specimen; Curve B represents the data gathered on the first test using the copper iodide-copper-coated tool of this invention. In the second test, the removal rate was set at 1.6 cubic inch per minute at the same surface speed changing the depth of cut to 0.060 inch and the feed to 0.009 ipr. Curves C and D, respectively, represent the data collected on the second run, using the control tool and the copper iodide-copper-coated tool of this invention.

EXAMPLE II

Figure 5:
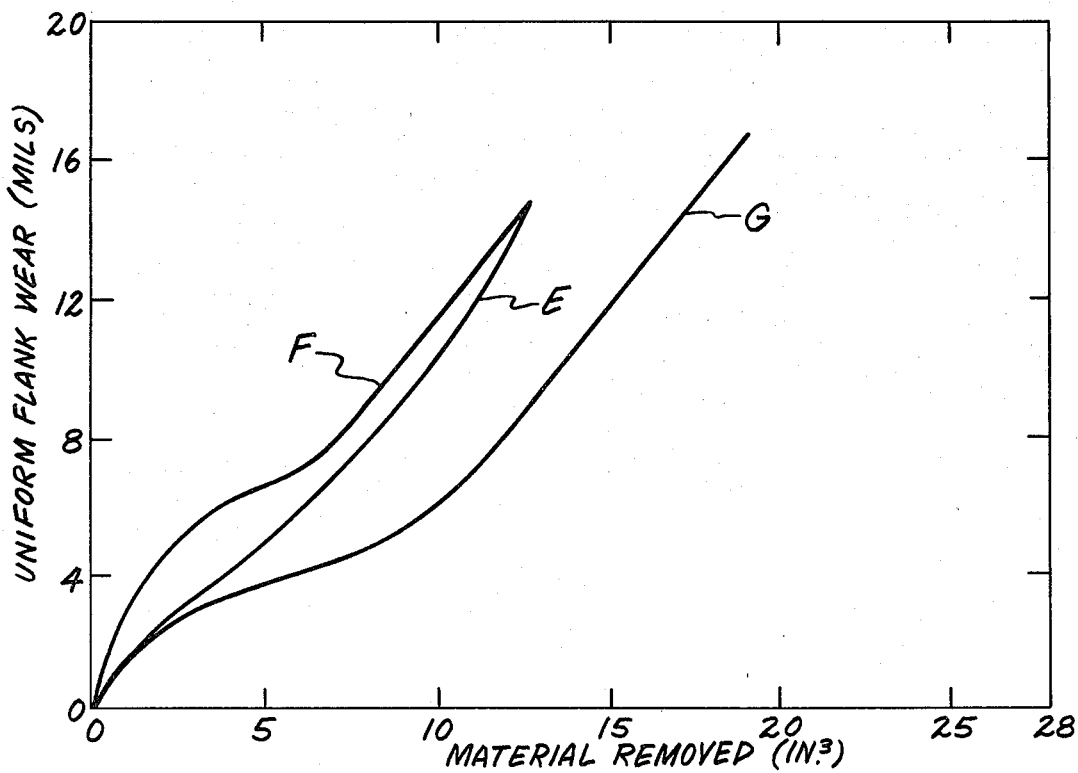
FIG. 5 is another chart like that of FIG. 4 on which uniform flank wear (in mils) is plotted against material removed (in cubic inches), the three curves illustrating date obtained in experimental comparison of tools of this invention with those of the prior art.

The copper-coated body and the copper iodide-copper-coated body prepared by the process described in Example I were tested in another experiment using the materials and equipment described in Example I in the same way regarding speed, feed, depth of cut and geometry, a counterpart control specimen being used for comparison purposes. Again, the material removed is plotted against uniform flankwear on the chart of FIG. 5 where Curve E represents the data collected in the use of the control specimen; Curve F represents the data gathered in the use of the copper-coated specimen and Curve G represents the data gathered in the use of the copper iodide film-coated, copper-coated body of this invention. The material removal rate in all these turning experiments was 1.03 cubic inch per minute.

What is claimed is:

1. A self-lubricating cutting tool comprising
   (a) a tool body,
   (b) a layer of copper metal bonded to surface area of said body at which cutting action occurs in use, and
   (c) a film of copper iodide formed integral with the outer surface of said copper layer.

2. A tool of claim 1 in which the tool body consists of cemented carbide and the copper coating is of thickness from about one micron to about 25 microns.

3. A tool of claim 1 in which the body is of tool steel.

4. A method making a self-lubricating metal cutting tool which comprises the steps of forming a tool body, applying an adherent copper coating to the body, and forming a film on the copper coating of a copper iodide.

5. A method of claim 4 including the step of forming the tool body of cemented carbide and in which the copper coating is vapor deposited on the tool body.

6. The method of claim 4 in which as the film-forming step iodine is contacted with the copper coating at elevated temperature.

7. The method of claim 4 including the step of forming the metal body of tool steel and in which the copper coating is electrodeposited on the metal body.

8. The method of making a self-lubricating cemented carbide cutting tool which comprises the steps of forming a cemented carbide tool body of desired size and shape, coating surface area of said tool body with a layer of copper, from about one micron to about 25 microns in thickness, heating the copper clad body and thereby bonding the copper layer to said tool body by sintering, contacting the outer surface of the copper layer with iodine, and reacting the iodine with the copper to form an adherent film of copper iodide on the copper layer.

* * * * *